United States Patent [19]
Awamoto et al.

[11] Patent Number: 5,898,414
[45] Date of Patent: Apr. 27, 1999

[54] DISPLAY METHOD FOR INTERMEDIATE GRAY SCALE AND DISPLAY APPARATUS FOR EXPRESSING INTERMEDIATE GRAY SCALE

[75] Inventors: Kenji Awamoto; Naoki Matsui; Tadatsugu Hirose; Fumitaka Asami, all of Kawasaki, Japan

[73] Assignee: Fujitsu Limited, Kawasaki, Japan

[21] Appl. No.: 08/865,124

[22] Filed: May 30, 1997

[30] Foreign Application Priority Data

Jan. 20, 1997 [JP] Japan .................................. 9-008030

[51] Int. Cl.⁶ .................................................. G09G 3/20
[52] U.S. Cl. ............................ 345/55; 345/89; 345/148; 348/792; 348/793
[58] Field of Search ........................... 345/55, 67–69, 345/89, 148, 88, 147, 99, 100, 60, 63, 103, 430, 431, 20; 348/671, 446, 447, 793, 792; 358/458; 386/109

[56] References Cited

U.S. PATENT DOCUMENTS

| | | | |
|---|---|---|---|
| 5,436,634 | 7/1995 | Kanazawa | 345/67 |
| 5,475,448 | 12/1995 | Saegusa | 348/797 |
| 5,583,527 | 12/1996 | Fujisaki et al. | 345/55 |
| 5,701,135 | 12/1997 | Aratani et al. | 345/89 |

FOREIGN PATENT DOCUMENTS 2 694 118   1/1994   France.

*Primary Examiner*—Richard A. Hjerpe
*Assistant Examiner*—Francis N. Nguyen
*Attorney, Agent, or Firm*—Staas & Halsey

[57] ABSTRACT

A display apparatus permitting high resolution and a large number of gray-scale levels and causing indiscernible flicker has been disclosed. One frame is divided into or composed of j subframes, and light is produced according to a luminance level predetermined subframe by subframe in order to express intermediate gray-scale of a picture. Emphasis is put on the fact that display to be performed during each subframe within one frame can be controlled independently. An interlaced-scanning display is carried out during k subframes associated with low-order weighted bits out of j subframes, and a noninterlaced-scanning display is carried out during the other j-k subframes associated with high-order weighted bits. The ratio of an addressing scan time to a subframe associated with a small weight is large, and the ratio of an addressing scan time to a whole frame is very large. If the addressing scan time can be reduced as mentioned above, a great effect would be exerted. Moreover, the luminance levels to be determined in relation to the subframes during which interlaced-scanning display is carried out are so low that the influence of the reduction on a whole picture is limited.

25 Claims, 14 Drawing Sheets

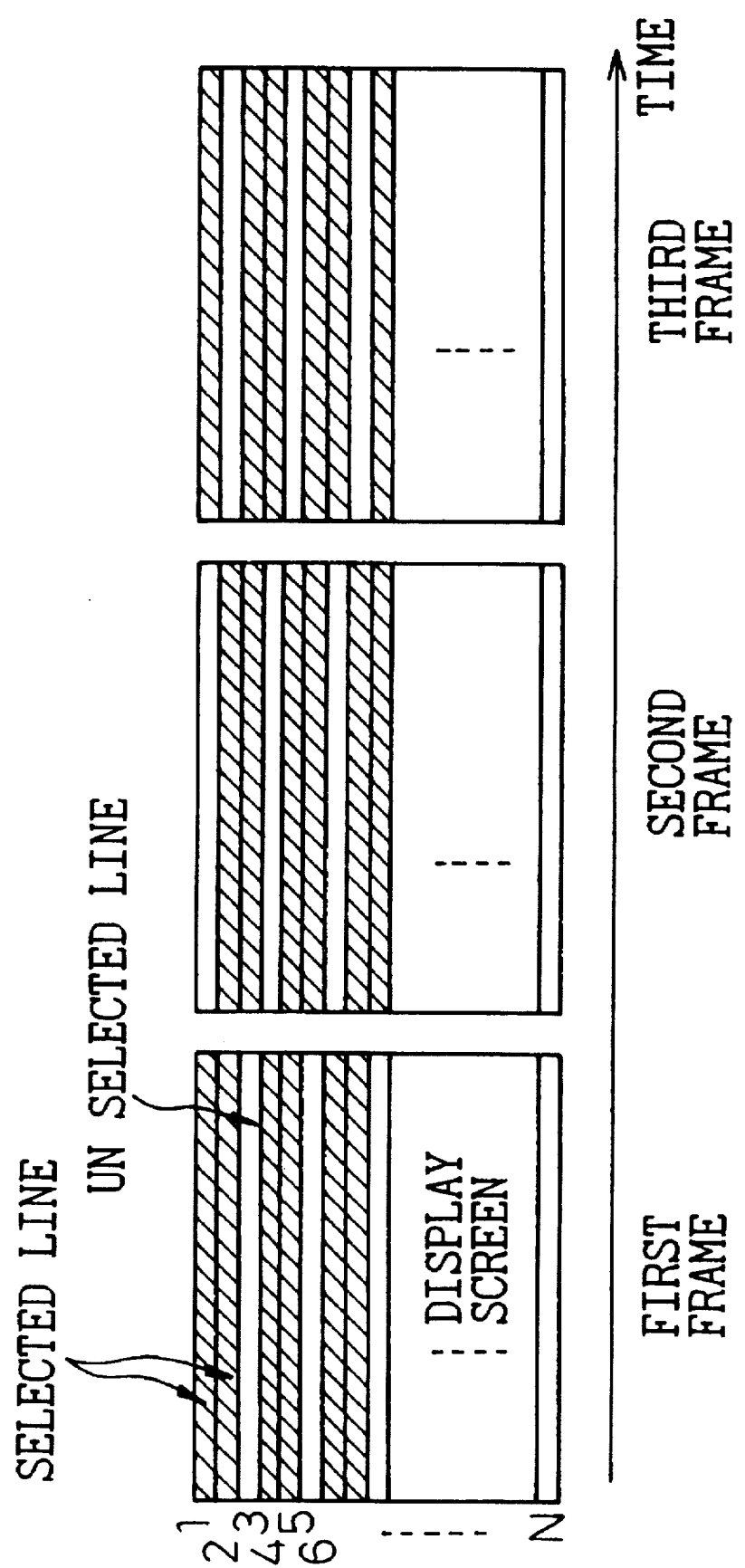

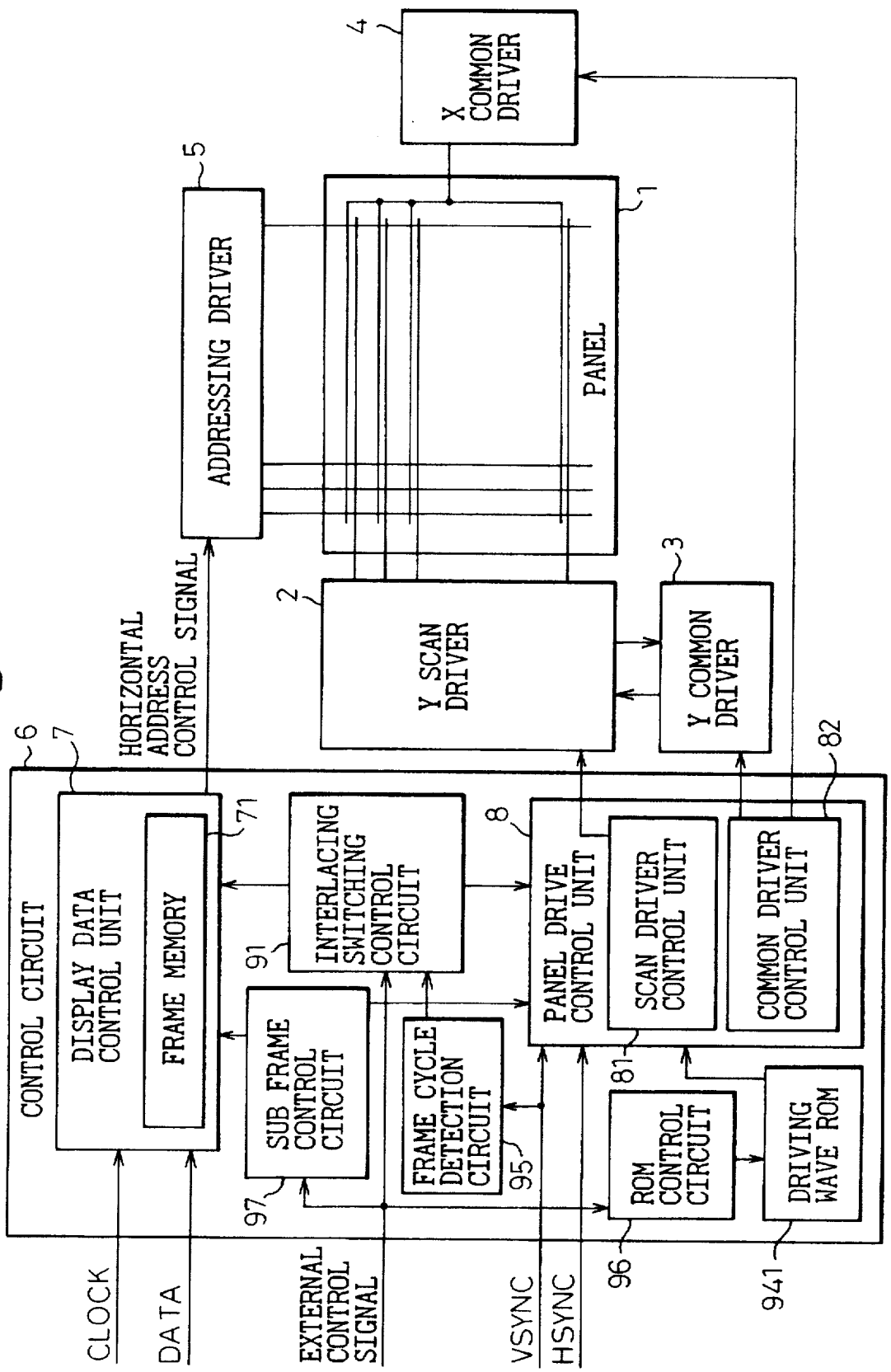

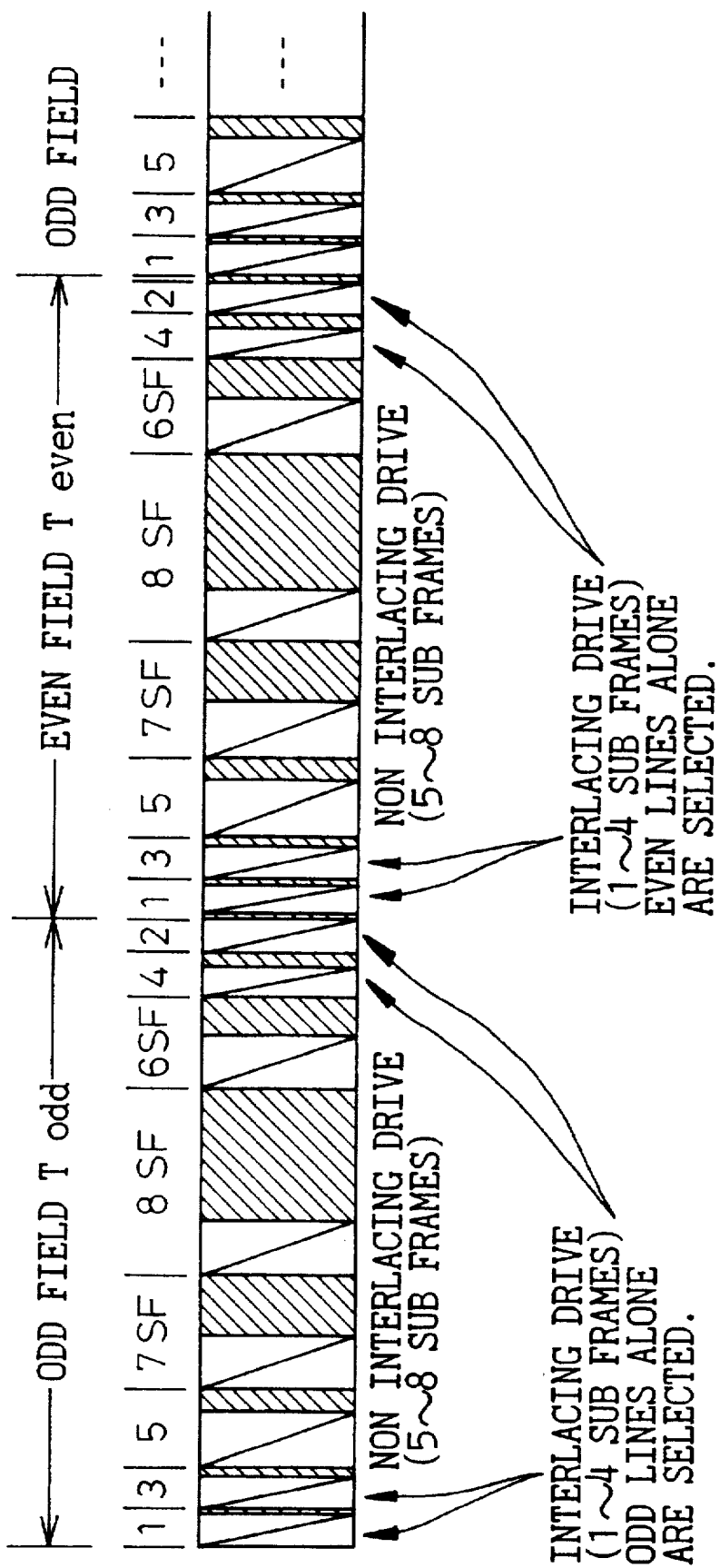

DISPLAY METHOD FOR INTERMEDIATE GRAY SCALE AND DISPLAY APPARATUS FOR EXPRESSING INTERMEDIATE GRAY SCALE

BACKGROUND OF THE INVENTION

1. Field of the Invention

The present invention relates to a display method and apparatus in which a display unit composed of a plurality of display cells each having the capability of a memory is employed. More particularly, the present invention relates to a display method and plasma display panel (PDP) apparatus in which an AC type PDP capable of expressing multilevel gray-scale at high resolution is employed

2. Description of the Related Art

The present invention relates to a display apparatus for displaying data by producing light at cells after writing the data to be displayed at the locations of the cells, wherein one frame is divided into a plurality of subframes associated with different luminance levels, and subframes during which light is produced are combined in order to achieve gray-scale display. This approach has been employed in a wide range of flat-panel display apparatuses. A typical example is a PDP apparatus. A description will follow taking an AC type PDP apparatus as an example. However, the present invention is not limited to this type of display apparatus. For example, the present invention can also be adapted to a display apparatus in which a liquid-crystal display panel is used in combination with a light source whose on and off states are controllable in order to achieve a gray-scale display.

In an AC type PDP, each subframe is subdivided into a reset period, an addressing period, and a sustaining period. Gray-scale display is achieved by associating bits of display data with the subframes, and changing the lengths of the sustaining periods within the subframes according to weights imposed on the bits. In recent years, a PDP apparatus has been required, like other types of display apparatuses, to offer high resolution and high display quality. To ensure a high display quality, it is necessary to increase the number of display gray-scale levels and raise the frame frequency. Moreover, the number of scanning lines must be increased in order to improve resolution. In an AC type PDP apparatus, a subframe approach is adopted for controlling gray-scale. To increase the number of gray-scale levels, it is necessary to increase the number of subframes. Increases in resolution and in number of display gray-scale levels cause the frame frequency to decrease. To increase the number of scanning lines and the number of subframes without any decrease in frame frequency, it is necessary to shorten one subframe and reduce the time required for each addressing scan. However, when an addressing period is shortened, the margin of operation is reduced. It is therefore difficult to reduce time under the current situation.

As a method for solving the foregoing problem a method in which interlaced-scanning is adopted for an addressing scan, and the number of addressing scans (display lines) to be carried out during all subframes is halved, has been adopted in the past. However, when the known interlaced-scanning addressing scan is adopted, occurrence of flicker in a display picture becomes a problem. Occurrence of flicker becomes a significant problem especially when both lines and characters are displayed in the same manner as they are on a display screen of a computer. Flicker is alleviated by shortening a frame. For the aforesaid reasons, there is a difficulty in shortening the frame Tf.

SUMMARY OF THE INVENTION

An object of the present invention is to solve the problem of flicker stemming from interlaced-scanning of a display in a display apparatus and to realize a display apparatus causing indiscernible flicker and permitting high resolution and a large number of gray-scale levels.

To accomplish the above object, a display apparatus for carrying out gray-scale display using a subframe approach in accordance with the present invention puts emphasizes the fact that a display to be performed during each of the subframes of a frame can be controlled independently, achieves interlaced-scanning during k subframes associated with low-order weighted bits out of j subframes, and achieves noninterlaced-scanning during the other j-k subframes associated with high-order weighted bits. The ratio of an addressing scan time to a subframe associated with a small weight is large, and the ratio of an addressing scan time to a whole frame is very large. If the addressing scan time can be reduced as mentioned above, a large effect would be exerted. Moreover, luminance levels determined in relation to subframes during which interlaced-scanning display is carried out are so low that the influence of the reduction on a whole picture is limited.

A display control circuit can preferably vary the number of subframes, k, during which interlaced-scanning is achieved, the number of all subframes, j, or both of the numbers according to an external control signal. The display control circuit can preferably vary a picture display period within one frame. When the picture display period is varied, the number of subframes, k, during which interlaced-scanning is achieved, the number of all subframes, j, or both of the numbers should preferably be changed automatically according to the magnitude of the variation. Furthermore, the display control circuit can preferably vary a light producing period during each of j subframes. Moreover, when varying the number of all subframes, j, according to an external control signal, the display control circuit should preferably control a total light producing period within one frame so that the total light producing period remains constant.

The display unit further comprises a display data input interface or picture signal input interface. A writing addressing approach or erasure addressing approach may be adopted as a driving method for the display apparatus.

BRIEF DESCRIPTION OF THE DRAWINGS

The present invention will be more clearly understood from the description as set below with reference to the accompanying drawings, wherein:

FIG. 12 is a diagram showing operations performed in a fifth embodiment;

FIG. 13 is a diagram showing the configuration of an AC type PDP apparatus of a sixth embodiment; and FIG. 14 is a diagram showing the structure of a subframe in the sixth embodiment.

DESCRIPTION OF THE PREFERRED EMBODIMENTS

Before proceeding to a detailed description of the preferred embodiments of the present inventions a prior art plasma display apparatus will be described with reference to the accompanying drawings relating thereto for a clearer understanding of the differences between the prior art and the present invention.

Figure 1:
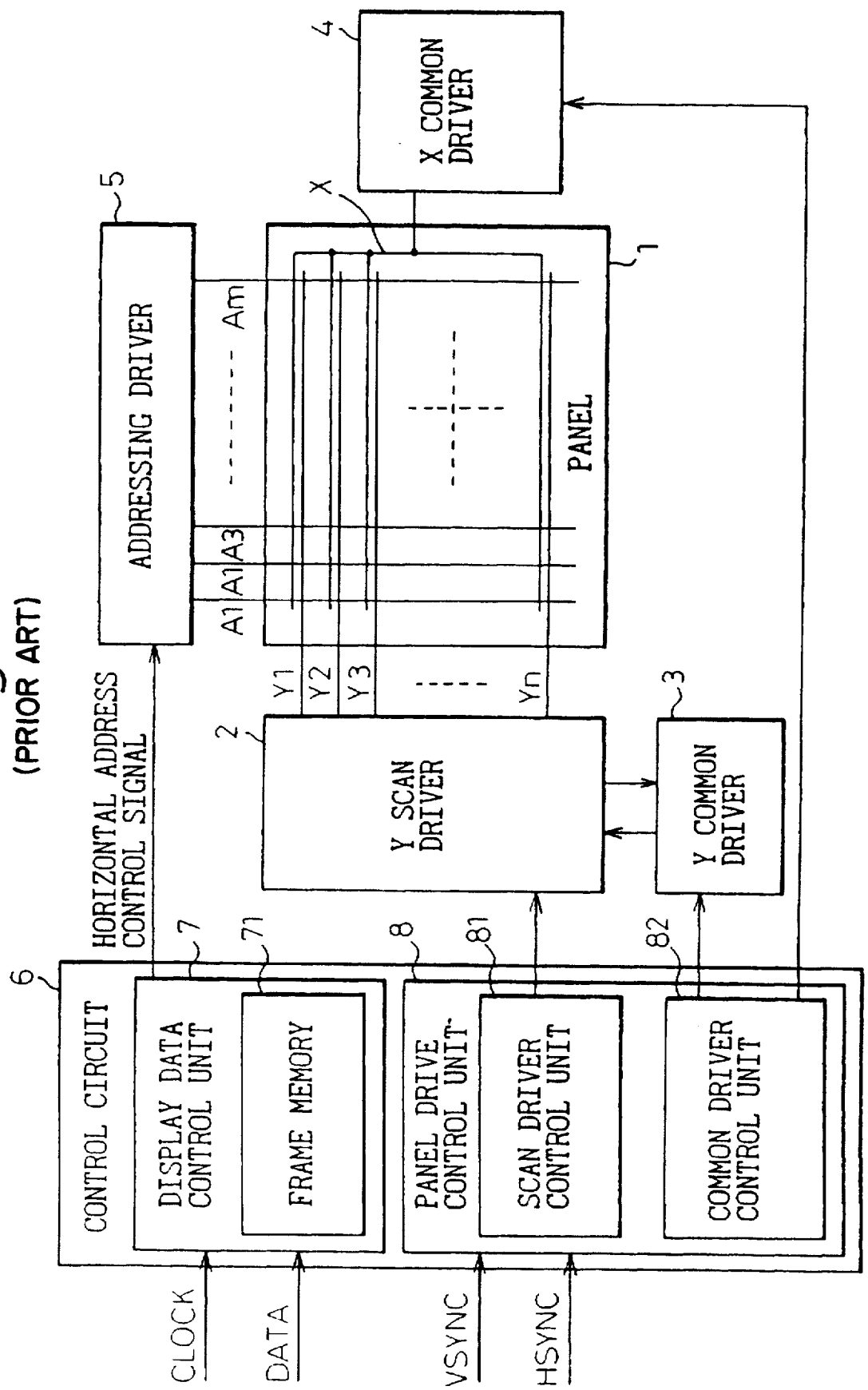
FIG. 1 is a diagram showing the configuration of a known AC type PDP apparatus.
Figure 2:
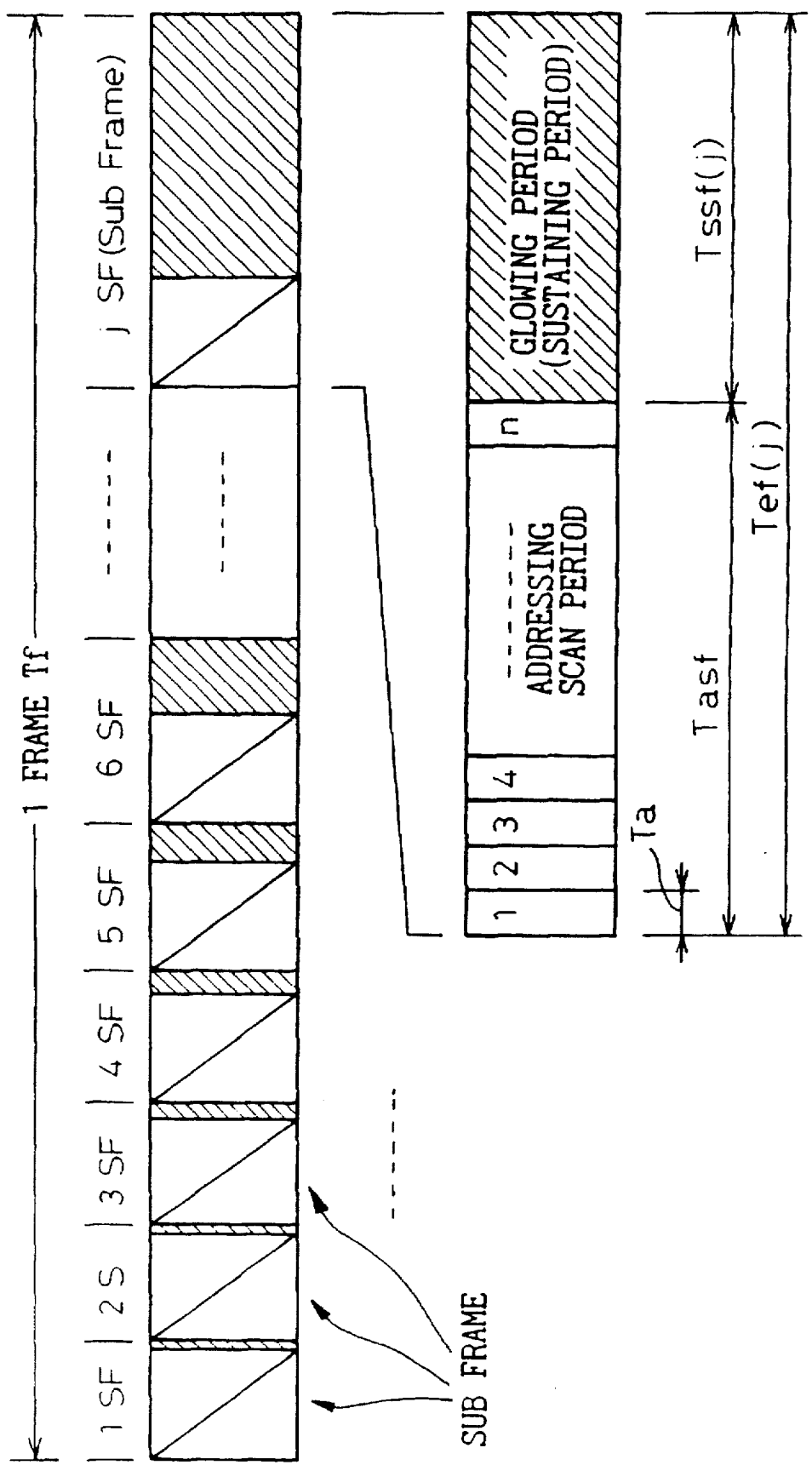
FIG. 2 is a diagram showing gray-scale display of a known subframe approach.
Figure 3:
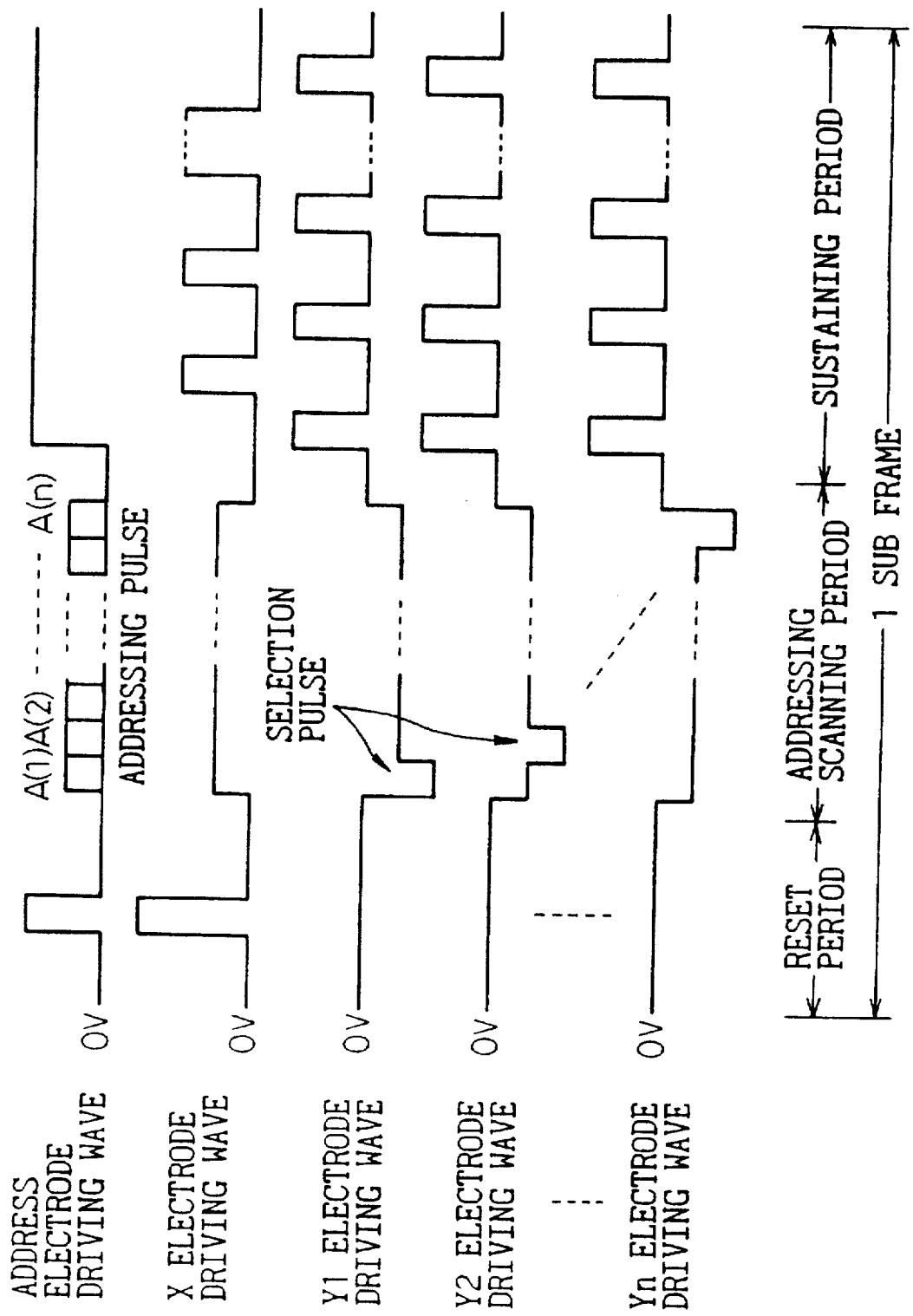
FIG. 3 is a diagram showing waveforms of driving waves employed in the AC type PDP apparatus.

FIG. 1 is a block diagram showing the configuration of a known AC type PDP apparatus, FIG. 2 is a diagram for explaining gray-scale control of a subframe approach, and FIG. 3 is a diagram showing waveforms of driving waves produced in the AC type PDP apparatus during one subframe.

For an AC type plasma display panel 1 designed for full-color display, a triple-electrode structure utilizing field discharge is generally known. In a PDP having the triple-electrode structure, the same number of pairs of an X electrode X and each of Y electrodes Y1–Yn and as the number of scanning lines are arranged in parallel with one another, and the same number of address electrodes Al–Am as the number of pixels lying in a horizontal direction are arranged in parallel with one another and perpendicular to the pairs of the X electrode and each of the Y electrodes. A cell is formed at each intersection between one pair of the X electrode and Y electrode and an address electrode. The X electrodes are connected in common. A high voltage is applied to the address electrodes and the Y electrodes to be selected and scanned successively in order to bring about discharge, whereby wall charge is produced. Thereafter, a pulse of a lower voltage having an opposite polarity is applied to the X electrode and Y electrodes. The accumulated wall charge is then superposed on the voltage in the discharge spaces. Consequently, the voltage in the discharge spaces gets high and exceeds a threshold value of a discharge voltage. Eventually, discharge starts. In other words, a cell features that wall charge is produced by one writing discharge, and thereafter, when sustaining pulses of opposite polarities are applied alternately, discharge is sustained. This feature is referred to as a memory effect or a memory function. In general, an AC type PDP achieves display by utilizing the memory effect.

As shown in FIG. 1, the address electrodes Al–Am are connected one by one to an addressing driver 5. The addressing driver 5 applies addressing pulses A(l)–A(n) according to display data during addressing discharge. The Y electrodes Y1–Yn are connected to a Y scan driver 2. During an addressing scan period, the Y scan driver 2 applies a scan selection pulse. During a sustaining period, a sustaining discharge pulse generated by a Y common driver 3 is applied to the Y electrodes Y1–Yn a driver 82. The X electrode is connected in common along all display lines, and a sustaining pulse is applied from an X common driver to the X electrode. These drivers are controlled by a control circuit 6. The control circuit is controlled with synchronizing (hereinafter, sync) signals CLOCK, VSYNC, and HSYNC, and a display data signal DATA which are input to the display apparatus.

Gray-scale display in the AC type PDP is, as shown in FIG. 2, achieved by varying the lengths of sustaining periods within subframes according to weights imposed on bits of display data which are associated with subframes. For example, as shown in FIG. 2, for carrying out $2^j$-1-level gray-scale display using j bits, one frame is divided into j subframes. The ratio of the lengths of sustaining periods Tssf(j) within the subframes is $1:2:4:8: \ldots :2^{j-1}$. As mentioned above, a glowing luminance level is determined with the length of each sustaining period. The ratio of the luminance levels determined in relation to the subframes is the same as the above. Herein, addressing periods Tasf within the subframes have the same length. As illustrated, within subframes associated with small weights, the addressing scan periods are longer than the sustaining periods. The ratio of the sustaining periods within the subframes is not always the same as above. For example, a plurality of subframes may have a sustaining period of the same length.

As shown in FIG. 3, each subframe is divided into a reset period, addressing period, and sustaining period. During a reset period, self-erasure discharge is carried out as follows: all the Y electrodes are set to 0 V; a pulse is applied to all the address electrodes and X electrode; and all the cells discharge, then the discharge stops by neutralizing by themselves. During a subsequent addressing scan period, address selection and discharge are carried out line by line in order to turn ON or OFF cells according to display data, and a priming charge is accumulated. Thereafter, during a sustaining (sustaining discharge) period, a pulse is applied alternately to the X electrode and Y electrodes for the purpose of sustaining discharge. Consequently, a picture is displayed during one subframe. A luminance level is determined by the number of pulses generated during a sustaining period.

In recent years, even a PDP apparatus, or other display apparatuses, have been required to provide high resolution and a high display quality. For ensuring high display quality, it is necessary to increase the number of display gray-scale levels and raise a frame frequency. For improving resolution, the number of scanning lines must be increased. As mentioned above, since an AC type PDP apparatus controls gray-scale according to a subframe approach, it is necessary, for increasing the number of gray-scale levels, to increase the number of subframes. Higher resolution and an increased number of display gray-scale levels work on the frame frequency in a direction in which the frame frequency decreases. For increasing the number of scanning lines and the number of subframes without decreasing the frame frequency, it is necessary to shorten one subframe and reduce the time required for each addressing scan. However, when an addressing period is shortened, a margin of operation diminishes. There is therefore difficulty in reducing the time under the current situation.

Figure 4:
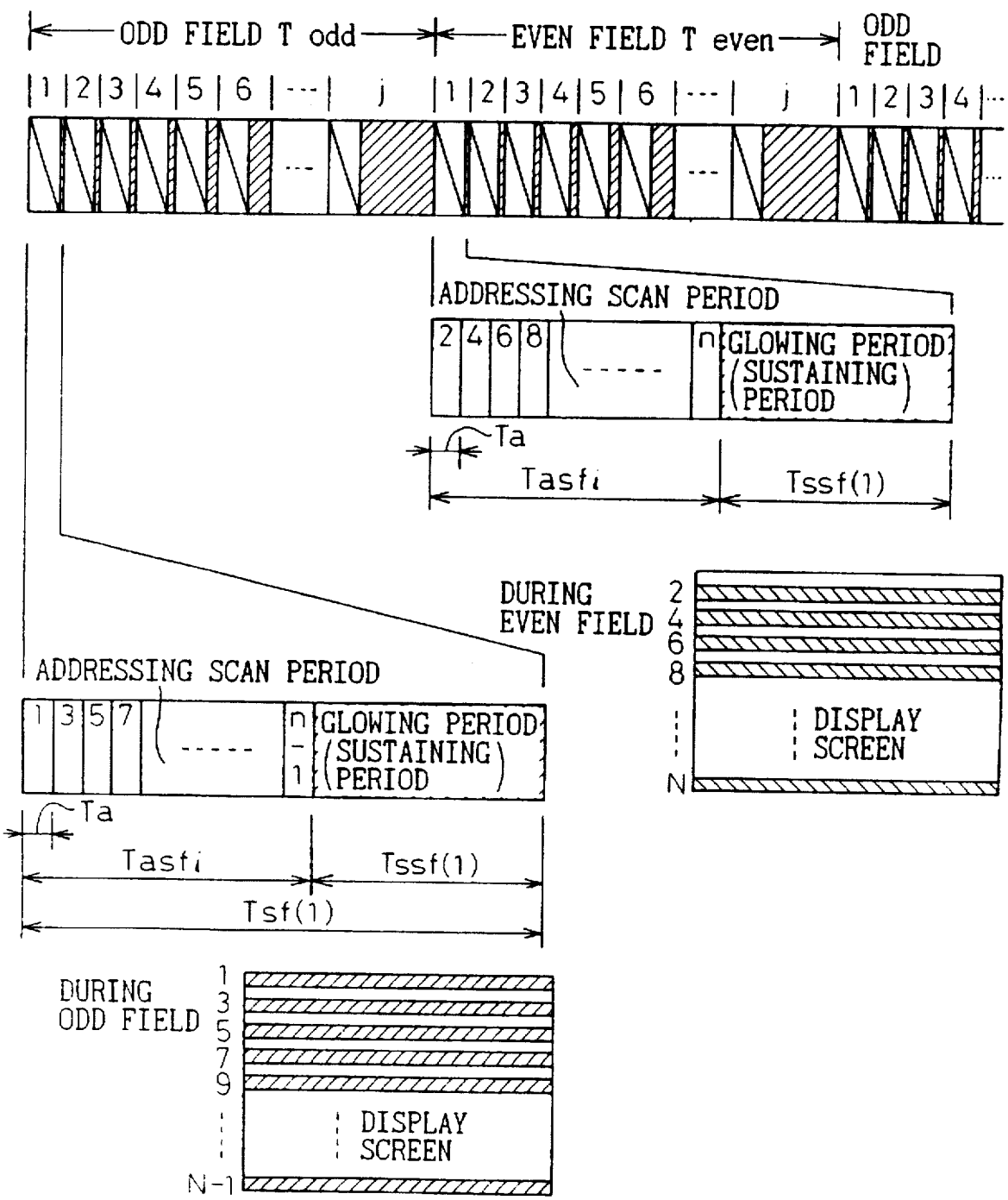
FIG. 4 is a diagram showing operations performed when interlaced-scanning display is performed according to the subframe approach.

As a method for solving the foregoing problem, a method in which interlaced scanning is adopted for an addressing scan and the number of addressing scans (display lines) to be carried out during all subframes is halved has been adopted in the past. FIG. 4 is a diagram for explaining operations to be performed when an interlaced-scanning addressing scan is carried out according to the subframe approach. An odd field Todd and even field Teven have the same length as one frame Tf employed in ordinary noninterlaced-scanning, and images to be displayed during two consecutive frames are displayed alternately on every other line. During an addressing scan period within an odd field, the first, third, fifth, etc., and n-t-th lines are selected successively for the purpose of addressing discharge. During an addressing scan period within an even field, the second, fourth, sixth, etc., and n-th lines are selected successively for the purpose of addressing discharge. In interlacing, an addressing scan time Tasfi is reduced to be a half of the one Tasf preserved in noninterlacing. On the contrary, when the number of scanning lines (number of addressing scans) is doubled to be 2n, the addressing scan time is the same as the one required for n scanning lines in noninterlacing. Herein, the addressing discharge time Ta per line shall be constant. In the drawing, the first subframes alone are illustrated in detail. The above addressing discharge (scan) to be performed on every other line applies to all the other subframes.

However, when the foregoing known interlaced-scanning addressing scan is carried out, the occurrence of flicker in a display picture becomes a problem. For example, when a white stripe of one line wide is displayed on every other line against a black background according to display data, that is, when display cells constituting the first, third, and fifth lines, etc. are allowed to glow, and display cells constituting the second, fourth, and sixth lines, etc. are made unlit, all the lines glow during an odd field and all the lines are unlit during an even field. Consequently, a whole screen is seen repeatedly glowing and dark at intervals of a frame cycle Tf. Moreover, when a rectangular window frame is displayed like the one on a display screen of a computer, if characters are displayed within the window frame, horizontal-line parts of the window frame and characters repeated glowing and dark, and are therefore seen flickering. Occurrence of such flicker becomes a significant problem especially on a display screen of a computer on which both lines and characters are displayed. Flicker is alleviated by shortening a frame Tf (increasing a frame 1/Tf). For the aforesaid reasons, there is difficulty in shortening the frame Tf.

Figure 5:
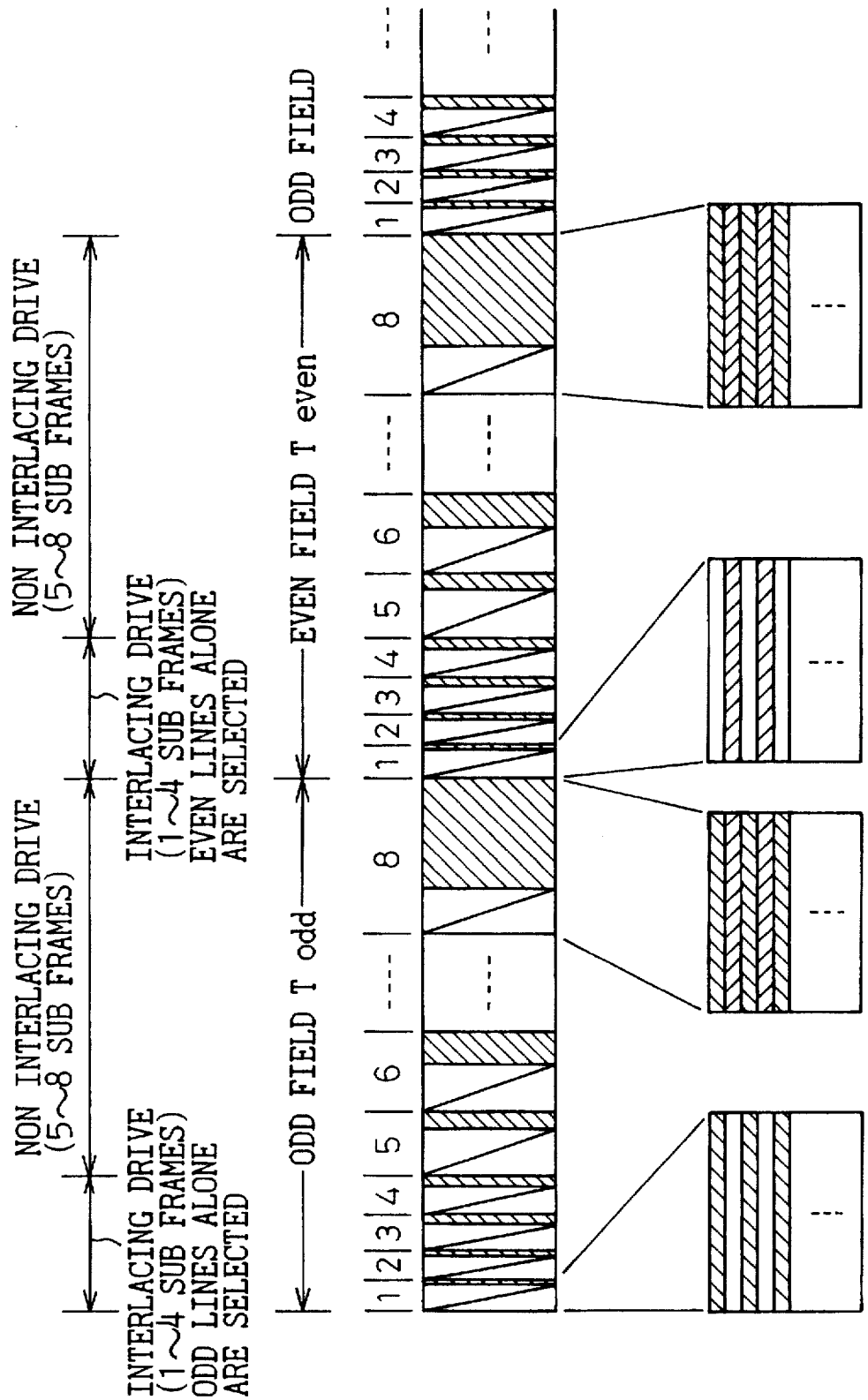
FIG. 5 is a diagram for explaining the principles of the present invention.

FIG. 5 is a diagram for explaining the principles of the present invention. A display apparatus for performing gray-scale display of a subframe approach in accordance with the present invention puts emphasis on the fact that display to be performed during each of subframes constituting one frame can be controlled independently. Interlaced-scanning display is carried out during k subframes associated with low-order weighted bits out of j subframes, and noninterlaced-scanning display is carried out during the other j-k subframes associated with high-order weighted bits, whereby the aforesaid object is accomplished To be more specific, according to the display method of the present invention, a display screen is composed of a plurality of cells, data to be displayed at a location of each cell is rewritten frame by frame, a luminance level at each cell is determined by an amount of light to be produced at the cell during one frame, one frame is divided into or composed of j subframes, and light is produced according to a luminance level that is different from subframe to subframe in order to express the intermediate gray-scale of a picture. The display method is characterized in that interlaced-scanning is achieved during k subframes associated with low-order bits weighted on luminance out of j subframes, and noninterlaced-scanning is achieved during the remaining j-k subframes. A display apparatus of the present invention comprises a display unit in which a display screen is composed of a plurality of cells, and in which picture data to be displayed at each cell is rewritten frame by frame, and a luminance level at each cell is determined with an amount of light to be produced by cell during one frame; an addressing scan circuit for selectively setting the plurality of cells to a written state; an irradiation control circuit for sustaining the plurality of cells in a light-produced state according to the written state set by the addressing scan means; and a display control circuit for controlling the addressing scan circuit and irradiation control circuit so that when one frame is divided into or composed of j subframes, light is produced according to a luminance level that is different from subframe to subframe in order to express an intermediate gray-scale of a picture. The display apparatus is characterized in that the display control circuit controls the addressing scan circuit and irradiation control circuit so that interlaced-scanning is achieved during k subframes associated with low-order bits weighted on luminance out of j subframes, and noninterlaced-scanning is achieved during the remaining j-k subframes.

For example, when interlaced-scanning display is carried out during two fields of an odd field and even field, only the odd-numbered scanning lines of the first third, fifth scanning lines, etc. are selected and displayed during k low-order subframes within an odd field, and only the even-numbered scanning lines of the second, fourth, sixth scanning lines, etc. are selected and displayed during corresponding subframes within an even field. During j-k high-order subframes within either an odd field or even field, all the scanning lines are displayed. Owing to this method of display, the addressing scan times Tasfi(1) to Tasfi(k) within the first to k-th low-order subframes which are needed in interlacing are half-those needed in non-interlacing. The addressing scan time within one frame is therefore reduced by (½)*(Tasfi*k). The number of scanning lines, the number of display gray-scale levels, or a frame frequency can be increased by a value determined with the reduced time. As shown in FIG. 5, the ratio of an addressing scan time to a subframe associated with a small weight is large, and the ratio of an addressing scan time to a whole frame is considerably large. If the addressing scan time can be reduced as mentioned above, a great effect would be exerted. Moreover, luminance levels determined in relation to subframes during which interlaced-scanning display is carried out are so low that the influence of the reduction on a whole picture is limited.

Figure 6:
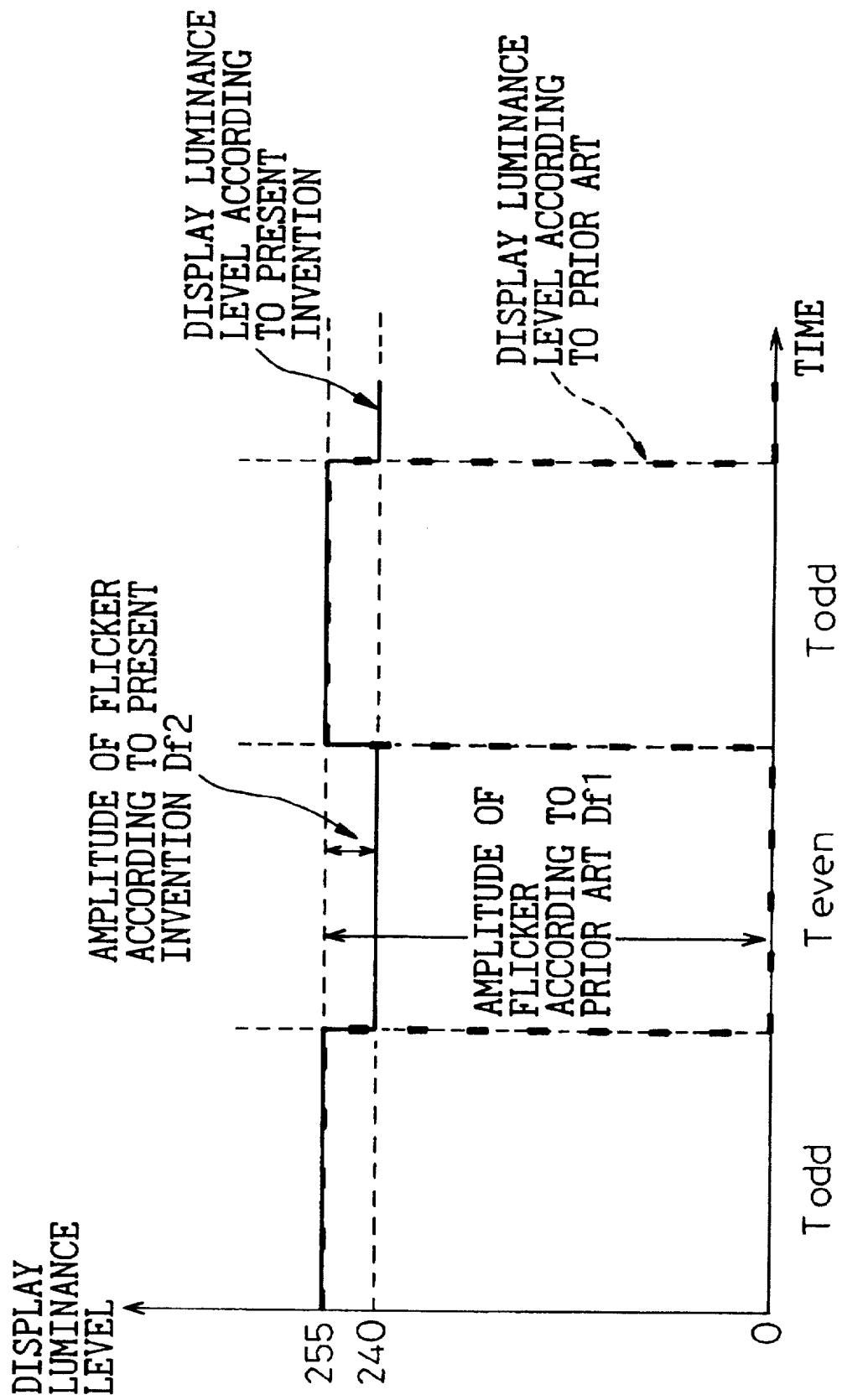
FIG. 6 is a diagram for explaining a decrease in amplitude of flicker in accordance with the present invention.

FIG. 6 is a diagram for explaining a decrease in amplitude of flicker occurring when a gray-scale level is expressed with eight bits and interlaced-scanning display is carried out during four low-order subframes. FIG. 6 is concerned with a situation in which cells corresponding to pixels that constitute an odd scanning line glow at a maximum luminance level of 255, and cells corresponding to pixels that constitute an even scanning line are unlit. A solid line indicates a change in luminance occurring in accordance with the present invention, while a dashed line indicates a change in luminance occurring in accordance with a prior art. In an interlacing display of the prior art, luminance levels 255 and 0 are repeated field by field, and the amplitude of flicker, Df1, is therefore 255. By contrast, according to the present invention, since luminance levels indicated by four low-order bits cause flicker, the amplitude of flicker, Df1, is calculated as Df1=1+2+4+8=15. Thus, according to the present invention, the amplitude of flicker is approximately 6% of that in the prior art. Talking of pixels having the other luminance levels, for example, when an odd scanning line exhibits a luminance level 128 or 64 and an even scanning line exhibits a luminance level 0, the amplitude of flicker occurring according to the prior art is 128 or 64. By contrast, according to the present invention, since four low-order bits indicate no luminance level, the amplitude of flicker is zero.

The display control circuit preferably varies the number of subframes, k, during which interlaced-scanning is achieved, the number of all subframes, j, or both of the numbers according to an external control signal.

The display control circuit can preferably vary a picture display period Tf within one frame. When the picture display period Tf is varied, the number of subframes, k, during which interlaced-scanning is achieved, the number of all subframes, j, or both of them are preferably changed automatically according to the magnitude of the variation.

Furthermore, the display control circuit can preferably vary a light producing period within each of j subframes. In this case, the light producing period within each subframe during which interlaced-scanning is achieved is made longer or the light producing period within each subframe during which noninterlaced-scanning is achieved is made shorter. When the light producing period within each subframe can be varied, if at least one of the number of subframes, k, during which interlaced-scanning is achieved and the number of all subframes, j, is varied, control is preferably given automatically so that the light producing period within each subframe during which interlaced-scanning is achieved is made longer or the light producing period within each subframe during which noninterlaced-scanning is achieved is made shorter. When varying the number of all subframes, j, according to an external control signal, the display control circuit should preferably control a total light producing period within one frame so that the total light producing period remains constant.

When interlaced-scanning is achieved during subframes associated with low-order bits alone, amounts of display light indicated by the low-order bits decrease accordingly. Consequently, an original relationship of luminance cannot be retained. For this reason, the light producing periods within subframes during which interlaced-scanning is achieved are made longer or the light producing periods within subframes during which noninterlaced-scanning is achieved are made shorter. This makes it possible to retain the relationship of luminance.

The display control circuit may give control so that during k subframes during which interlaced-scanning is achieved, all lines adjoining in a vertical direction are paired and then scanned in pairs successively, and the same contents are displayed on two lines. For scanning adjoining lines in pairs, a scan starting with the first line is carried out, and data to be displayed is data of an odd or even scanning line. Alternatively, a scan starting with the first line and a scan starting with the second line are carried out alternately screen by screen, and data of an odd scanning line and data for an even scanning line are displayed alternately.

Furthermore, the display control circuit may control, during $_LC_S$ frames, that is, combinations of S frames out of L frames, k subframes during which interlaced-scanning is achieved so that during L consecutive frames, display is performed continually on one of L consecutive lines, or k subframes during which interlaced-scanning is achieved so that S lines are selected successively from L consecutive lines and displayed. In this case, data for the selected line is displayed on all the L lines.

Furthermore, the display control circuit may vary display data to be displayed during j-k subframes during which noninterlaced-scanning is achieved relative to k subframes during which interlaced-scanning is achieved according to display data to be transmitted during fields during which no data is displayed. Specifically, display data of k low-order bits to be transmitted during fields during which no data is displayed is rounded and carried to the k+1-th bit and higher-order bits.

Furthermore, the display control circuit can preferably vary the display order of subframes constituting one frame. Varying the display order may be carried out in response to an external instruction signal or may be carried out automatically according to the number of subframes, k, during which interlaced-scanning is achieved and the number of subframes, j-k, during which noninterlaced-scanning is achieved.

The display apparatus further comprises a display data input interface or picture signal input interface. The driving method for the display unit may be a writing addressing approach or erasure addressing approach.

Figure 7:
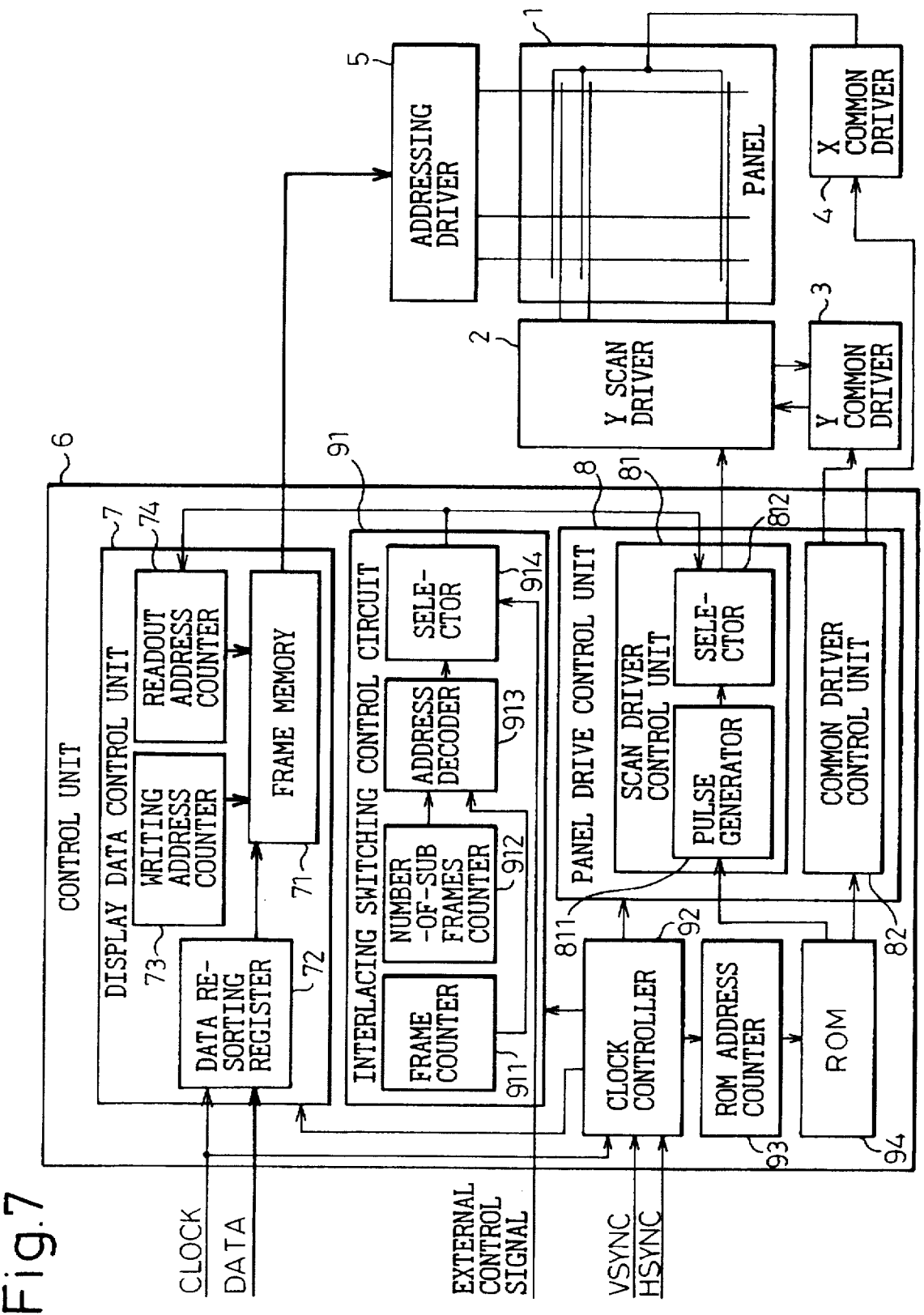
FIG. 7 is a diagram showing the configuration of an AC type PDP apparatus of a first embodiment.

FIG. 7 shows the configuration of an AC type PDP apparatus of a first embodiment of the present invention. The apparatus of the first embodiment includes an interlacing switching control circuit 91 in addition to the known components shown in FIG. 1. The driving method for a PDP may be a writing addressing approach or erasure addressing approach. The control circuit 6 includes a display data input interface or picture signal input interface. The interlacing switching control circuit 91 determines the number of low-order subframes, k, during which interlaced-scanning display is carried out, and sends a command indicating whether or not interlaced scanning is achieved during addressing scan periods to a display data control unit 7 and scan driver control unit 81.

Figure 8:
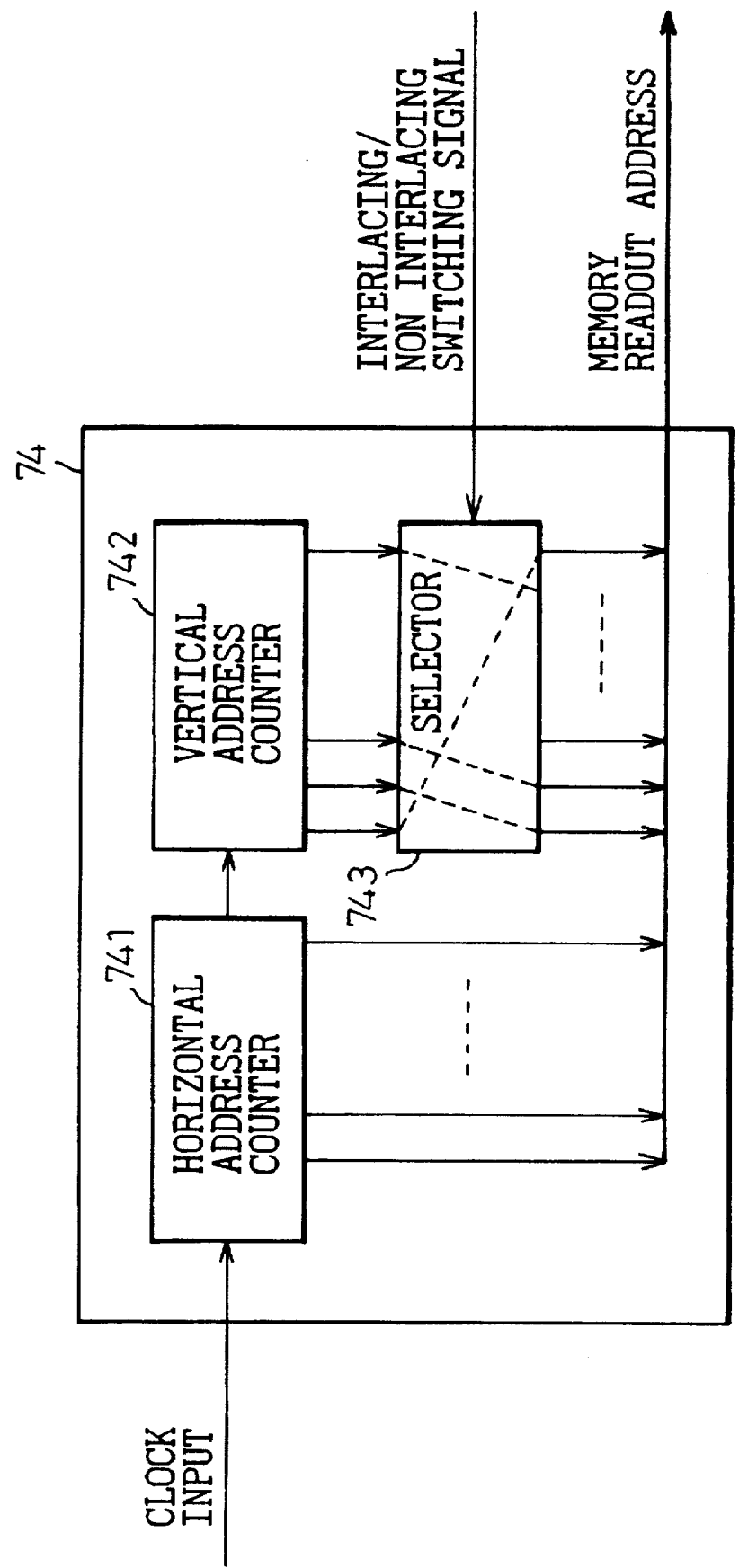
FIG. 8 is a diagram showing the configuration of a readout address counter in a display data control unit in the first embodiment.

The display data control unit 7 not only has the same ability as a known unit but also is designed to transmit a horizontal addressing control signal (addressing pulse) used to display data for the first, third, fifth, etc., and n-1-th lines and data for the second, fourth, sixth, etc., and n-th lines alternately during each field according to a command indicating that interlaced-scanning should be achieved. FIG. 8 is a diagram showing an example of the configuration of a readout address counter 74 included in the display data control unit 7. In addition to the known components of a horizontal address counter 741 and vertical address counter 742, a selector 743 for switching the most-significant bit of a count value provided by the vertical address counter 742 to the least-significant bit in response to an interlacing/noninterlacing switching signal is included. The most-significant bit provided by the vertical address counter 742 is a signal indicating an odd field or even field. If the signal is assigned to the least-significant bit, data of odd-numbered scanning lines is selected and read from picture data developed in a frame memory 71 during an odd field, and data of even-numbered lines is selected and read during an even field.

Image data supplied externally is temporarily developed in the frame memory 71. When picture data is supplied in a form for non-interlaced-scanning, picture data to be displayed during each frame is developed in the frame memory 71. As for given low-order bits, those concerning odd scanning lines alone are read during a certain frame, and those concerning even scanning lines alone are read during the next frame. As for the other high-order bits, they are read and displayed all the time. When picture data is supplied in a form for interlaced-scanning, picture data to be displayed during an odd field and even field is developed in the frame memory 71. As for given low-order bits, those of data to be displayed during either the odd field or even field are read and displayed. High-order bits are all read and displayed. As for the given low-order bits, those of data to be displayed during either the odd field or even field may be displayed or the given low-order bits of data to be displayed during both the odd field and even field may be displayed alternately.

A scan driver control unit 81 not only has the same ability as a known one but also is designed to alternately select lines Y1, Y3, Y5, etc. and Yn−1 and lines Y2, Y4, Y6, etc., and Yn alternately for each field in response to a command indicating interlaced-scanning.

The interlacing switching control unit 91 is designed to arbitrarily vary the number of low-order subframes, during which interlaced-scanning display is carried out, according to an external control signal. Depending on the purpose of use of a PDP apparatus, setting and adjustment can be carried out, for example, switching can be carried out by increasing the number of low-order subframes during which interlaced-scanning display is carried out, increasing the number of display gray-scale levels by increasing the number of all subframes using an extra time, or decreasing the number of display gray-scale levels by decreasing the number of all subframes, so that noninterlaced-scanning display can be achieved during all subframes.

Figure 9:
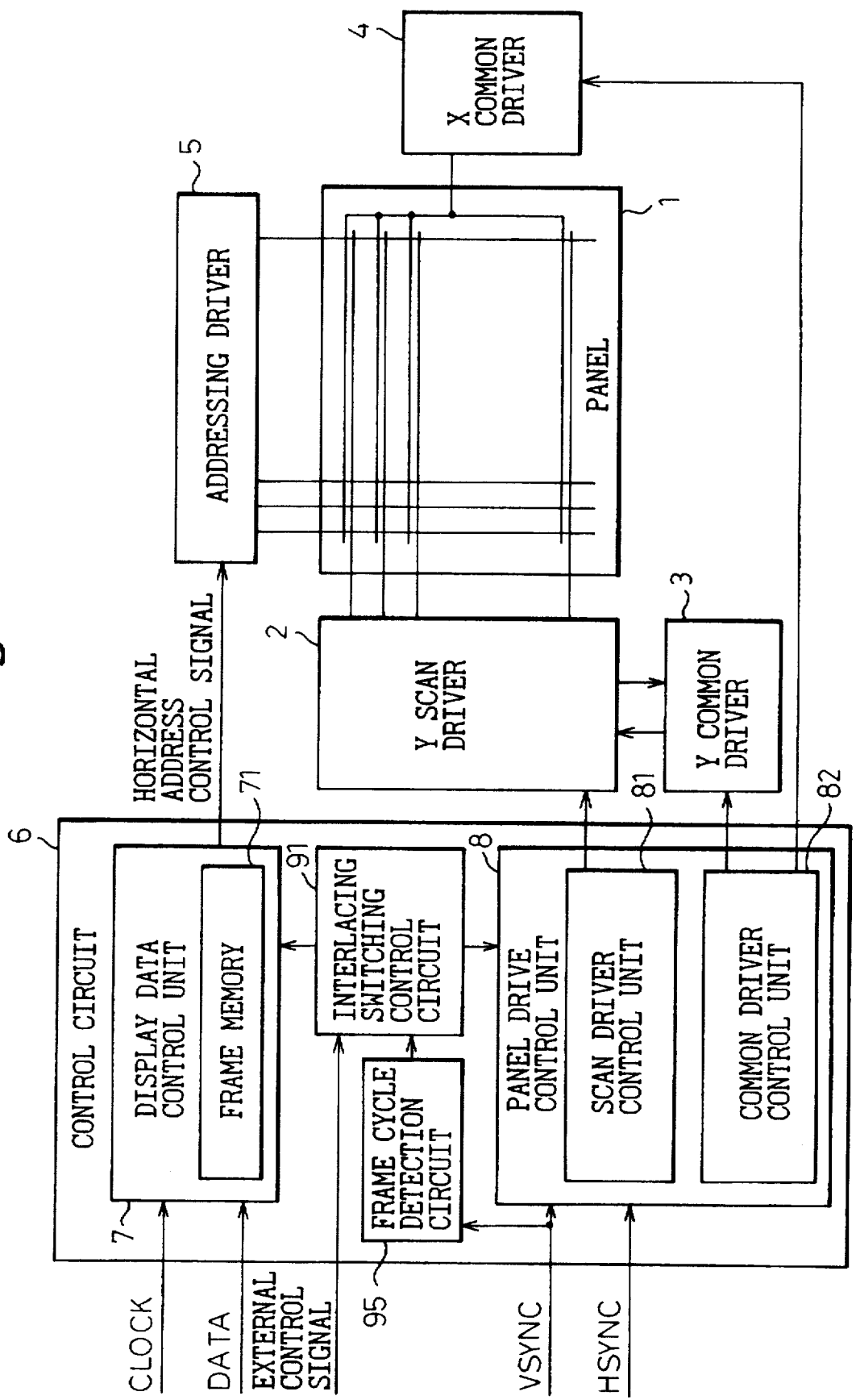
FIG. 9 is a diagram showing the configuration of an AC type PDP unit of a second embodiment.

FIG. 9 is a diagram showing the configuration of a PDP apparatus of a second embodiment. The apparatus of the second embodiment includes not only the same components as those of the apparatus of the first embodiment but also a frame cycle detection circuit 95. The frame cycle detection circuit 95 detects a frame cycle for display data that is input externally, and sends the result of judgment to the interlacing switching control circuit 91. For example, when the frame cycle for input display data gets shorter, that is, when the frame frequency increases, control is given automatically so that the number of low-order subframes during which interlaced-scanning display is carried out increases. A display operation can therefore be carried out without any decrease in the number of subframes. By contrast, when the frame cycle for input display data gets longer, that is, when the frame frequency decreases, control is given automatically so that the number of low-order subframes during which interlaced-scanning display is carried out decreases. Consequently, a display operation can be carried out with the amplitude of flicker reduced further. In the second embodiment, such control is given automatically. Alternatively, the control may be given in response to an external control signal. In this case, manual switching is enabled.

Figure 10:
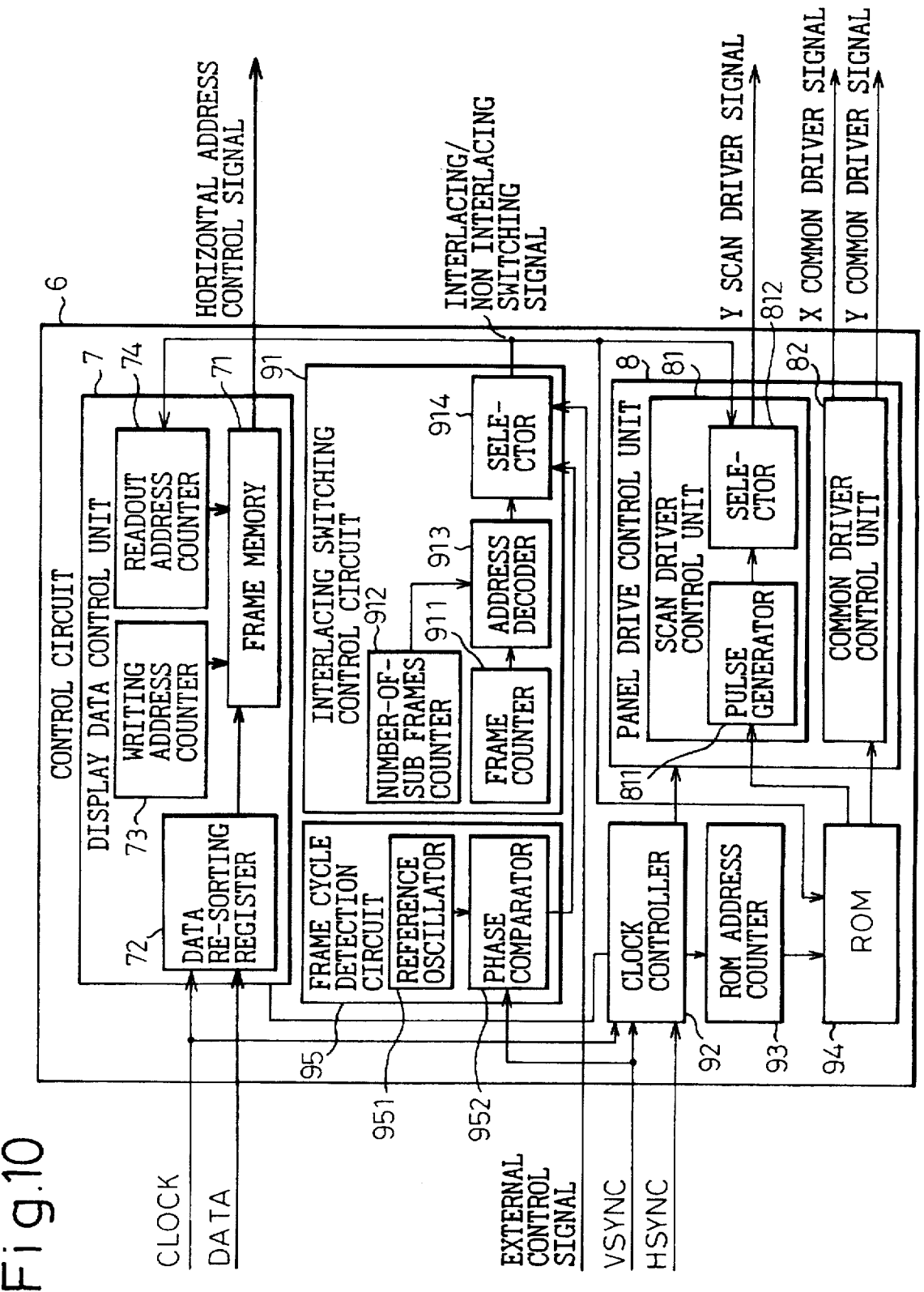
FIG. 10 is a diagram showing the configuration of a control unit in an AC type PDP apparatus of a third embodiment.

FIG. 10 is a diagram showing the configuration of a control unit in a PDP apparatus of a third embodiment. The apparatus of the third embodiment includes a driving wave ROM 94, a ROM address counter 93, and a clock controller 92 in addition to the same components as those in the second embodiment. In the driving wave ROM 94, data concerning waveforms of pulses to be applied to the electrodes, which are shown in FIG. 3, are stored in relation to each subframe. Owing to this configuration, a sustaining period can be controlled subframe by subframe. The waveforms relating to each subframe are stored separately between interlaced-scanning display and noninterlaced-scanning display. For example, the waveforms are stored so that the length of parts of waves coincident with a sustaining period (the number of pulses) during interlaced-scanning display is double that during noninterlaced-scanning display. As mentioned above, when interlaced-scanning display is performed during k low-order subframes, a decrease in luminance and a distortion in gray-scale display which stem from interlaced-scanning display can be corrected automatically by reading data of relevant waveforms of driving waves from the ROM 94 and by doubling the lengths of sustaining periods. Using the same configuration, the distortion in gray-scale display stemming from interlaced-scanning display can be corrected automatically by halving the lengths of sustaining periods within j-k high-order subframes during noninterlaced-scanning display. Furthermore, using the same circuitry, when the j value is changed, relevant waveforms of driving waves can be read from the ROM 94 and control can be given so that a total length of all the sustaining periods within one frame (number of pulses) remains constant In this case, if the j value that is the number of display gray-scale levels is changed, display luminance does not vary.

The driving wave ROM 94 and ROM address counter 93 in the third embodiment are not limited to ROMs but may be formed with dedicated logic circuits.

In the case of the PDP apparatuses of the first to third embodiments, control may be given so that: when display data of a certain pixel coincides with a field in which k low-order bits are not displayed, if the values of k low-order bits associated with subframes during which interlacing is adopted (0 to $2^{k}-1$) are $2^{k}/2$ and larger, the values are carried to the k+1-th bit and subsequent high-order bits; and if the values are less than $2^{k}/2$, they are not carried to the high-order bits. For example, assume that display data indicates a gray-scale level with eight bits thereof and interlaced-scanning display is carried out during subframes associated with four low-order bits. In this case, assuming that the data value of a certain pixel ranges, for example, from 128 to 143, when the pixel is supposed to be displayed during a field during which k low-order bits are not displayed, unless carrying is performed, the amplitude of flicker, Df2, ranges from 0 to 15. When the carrying is performed, if the pixel has a value ranging from 128 to 135, the pixel is displayed with a value 128. If the pixel has a value ranging from 136 to 143, it is displayed with a value 144. The amplitude of flicker, Df2, therefore ranges from 0 to 7. Thus, the amplitude of flicker stemming from interlaced-scanning display can be halved and a decrease in average luminance on a screen can be corrected.

In the PDP apparatuses of the first to third embodiments, different kinds of scans can be carried out during addressing scan periods having the same length. Fourth and fifth embodiments are embodiments enabling this operating mode.

Figure 11:
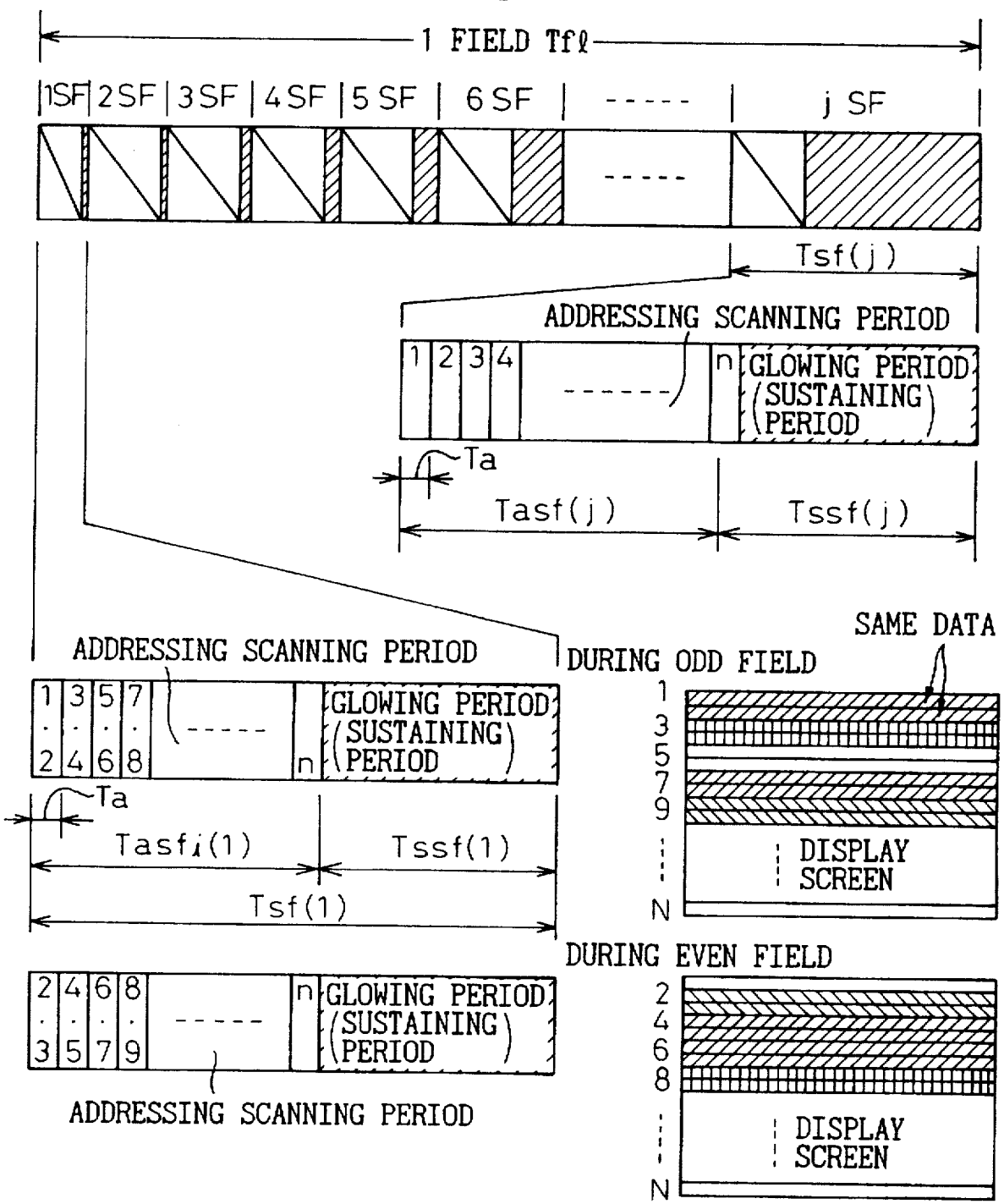
FIG. 11 is a diagram showing operations performed in a fourth embodiment.

FIG. 11 is a diagram showing operations performed in the fourth embodiment in which the same data is displayed at locations of cells constituting two lines during interlaced-scanning display. In the fourth embodiment, interlaced-scanning display is carried out during the first subframe. Within the subframe, control is given so that two lines are selected simultaneously during an addressing scan period and the same data is displayed on each line. During an odd field, picture data for the first, third, fifth lines, etc. is displayed on the first and second lines, third and fourth lines, fifth and sixth lines, etc. During an even field, picture data for the second, fourth, sixth lines, etc. is displayed on the second and third lines, fourth and fifth lines, sixth and seventh lines, etc. This control can be realized by modifying the scan driver control circuit 8 and by producing two consecutive scanning pulses so that when a command indicating interlaced-scanning display is received, two lines are selected simultaneously during each addressing scan period. When this control is given, the same data is always displayed on two or more lines of the display screen during low-order subframes during which interlaced-scanning display is carried out. A decrease in luminance stemming from interlaced-scanning display does not therefore occur, and gray-scale can be expressed without any distortion. During an even field, picture data for the second, fourth, sixth lines, etc. may be displayed on the first and second lines, third and fourth lines, fifth and sixth lines, etc. This scanning method shall be referred to as double scanning.

In the fourth embodiment, control is given so that a scan starting with the first line and a scan starting with the second line are carried out alternately during low-order subframes during which interlaced-scanning display is carried out. Aside from this control, control may be given so that two lines starting with the first line are selected simultaneously during an addressing scan, only picture data for odd lines of the first, third, fifth lines, etc. is displayed all the time, or only picture data for even lines of the second, fourth, sixth lines, etc. may be displayed all the time. In this case, picture data for the odd lines or even lines is lost, and the resolution in a vertical direction goes down to a half. Nevertheless, flicker stemming from interlaced-scanning display will not occur even during low-order subframes. A decrease in luminance stemming from interlaced-scanning display does not take place. Furthermore, since a decrease in resolution in the vertical direction occurs in a low gray-scale picture area alone that little affects a display picture, the display picture is hardly affected.

FIG. 12 is a diagram showing a driving method of a fifth embodiment for driving the PDP apparatuses of the first to third embodiments. Within k low-order subframes during which interlaced-scanning display is carried out, control is given during an addressing scan so that one line is selected from L lines and L-1 lines remain unselected. Alternatively, within k low-order subframes during which interlaced-scanning display is carried out, line selection is performed during an addressing scan in such a way that S lines are selected from L lines and L-S lines remain unselected. In this case, $_LC_S$ combinations are conceivable as the combination of S lines out of L lines. Control is therefore given so that L lines are selected in Ss continually during $_LC_S$ consecutive frames (equivalent to the number of combinations of S lines out of L lines). Herein, L denotes 3 or a larger integer (3, 4, 5, etc.), and S denotes 2 or a larger integer (2, 3, 4, etc.) equal to or smaller than L-1. In the example of FIG. 12, within k low-order subframes during which interlaced-scanning display is carried out, line selection is performed during an addressing scan in such a way that two lines are selected from three lines, and two lines are selected continually during three ($_3C_2$) consecutive frames. In this case, flicker can be further alleviated compared with interlaced-scanning in which every other line is scanned during each field. However, the time required for scanning (2/3)*n lines must be preserved during an addressing scan period. The effect of reducing the addressing scan time is limited. Even when the above control method is adopted, the same data as that for an adjoining line can be displayed on an unselected line in the same manner as that in the double scanning approach described in conjunction with FIG. 11. For example, in FIG. 12, the display data control unit 7 and scan driver control unit 81 should give control so that the same data as that for the second line is displayed on the third line during the first frame, and the same data as that for the second line is displayed on the first line during the second frame. Any combination of the L and S values can be adopted freely as long as L>S is observed. In the case of L/2>S, the effect of shortening an addressing scan period is intensified. In the case of L/2<S, the effect of alleviating flicker is intensified.

FIG. 13 is a diagram showing the configuration of a PDP apparatus of a sixth embodiment. In the sixth embodiment, a subframe control circuit 97 is included for giving control so that subframes are arranged in arbitrary order. This makes it possible to change the order of subframes according to an external control signal. The order of subframes is conceivably, for example, as shown in FIG. 14, such that high-order subframes associated with large weights on luminance are arranged in the middle. The effects of flicker suppression and false color contour suppression to be exerted when subframes are not arranged in order of weight but arranged so that subframes associated with high luminance levels come in the middle, and the principles of operations for the suppression are described in, for example, Japanese Unexamined Patent Publication No. 3-145691. Japanese Unexamined Patent Publication No. 7-271325 has disclosed a PDP apparatus including a control means for arbitrarily changing the order of subframes. Since the length of each subframe gets shorter, the relative lengths of high-order subframes associated with high luminance levels in relation to the length of one frame increase. The effects of flicker suppression and false color contour suppression can be exerted more than those in the prior art. Furthermore, when the k value is changed, the relative timing of high-order subframes associated with high luminance levels within one frame varies. However, when subframes are rearranged according to the k value, the subframes can be arranged optimally all the time.

As described, according to the present invention, once a simple method of adding a circuit to a drive circuit in a known PDP apparatus is adopted, an interlaced-scanning addressing scan can be carried out with little flicker and the time required for addressing scan can be reduced. Consequently, the resolution of a display panel can be improved without a decrease in number of display frames or in number of display gray-scale levels. The present invention also exerts an effect of correcting a decrease in luminance and a distortion in display gray-scale which stem from interlaced-scanning display.

What is claimed is:

1. A display method for performing intermediate gray-scale of a picture, comprising the steps of:

performing interlaced scanning during low-order subframes associated with small weights on luminance; and performing noninterlaced scanning during subframes other than the low-order subframes.

2. A display apparatus, comprising:

a display unit, having a display screen with a plurality of cells, in which picture data to be displayed at locations of the plurality of cells is rewritten frame by frame, and in which a luminance level at each of the plurality of cells is determined by an amount of light produced by each cell during a frame;

an addressing scan circuit to selectively set said plurality of cells to a written state;

an irradiation control circuit to sustain said plurality of cells in a light-producing state according to the written state set by said addressing scan circuit; and a display control circuit to control said addressing scan circuit and irradiation control circuit so that when a frame is divided into subframes, light is produced according to a luminance level, that is different from subframe to subframe, to express an intermediate gray-scale of a picture, wherein said display control circuit controls said addressing scan circuit and irradiation control circuit so that interlaced scanning is achieved during low-order subframes associated with small weights on luminance, and noninterlaced scanning is achieved during remaining subframes.

3. A display apparatus according to claim 2, wherein said display control circuit varies the number of low-order subframes during which interlaced scanning is achieved, according to an external control signal.

4. A display apparatus according to claim 3, wherein said display control circuit varies the number of subframes corresponding to a total of the low-order subframes and the remaining subframes, according to an external control signal.

5. A display apparatus according to claim 3, wherein said display control circuit varies a picture display period within a frame, and when varying the picture display period, said display control circuit automatically changes the number of low-order subframes during which interlaced scanning is achieved according to a magnitude of the picture display period variation.

6. A display apparatus according to claim 4, wherein said display control circuit varies a picture display period within a frame, and when varying the picture display period, said display control circuit automatically changes at least one of the number of low-order subframes during which interlaced scanning is achieved and the total of the low-order subframes and remaining subframes, according to a magnitude of the picture display period variation.

7. A display apparatus according to claim 2, wherein said display control circuit varies a light producing period within each of the low-order subframes and remaining subframes.

8. A display apparatus according to claim 7, wherein said display control circuit controls the light producing period within a subframe during which interlaced scanning is achieved to be longer, or the light producing period within a subframe during which noninterlaced scanning is achieved to be shorter.

9. A display apparatus according to claim 3, wherein said display control circuit varies a light producing period within each of the subframes, and when varying the number of low-order subframes during which interlaced scanning is achieved, said display control circuit automatically increases a period during which the light is produced within a subframe that achieves interlaced scanning, or decreases a period during which the light is produced within a subframe that achieves noninterlaced scanning.

10. A display apparatus according to claim 4, wherein said display control circuit can vary the light producing period within each subframe, and when varying at least one of the low-order subframes during which interlaced scanning is achieved and the total of the low-order subframes and remaining subframes said display control circuit automatically increases a period during which the light is produced within a subframe that achieves interlaced scanning, or decreases a period during which the light is produced within a subframe that achieves noninterlaced scanning.

11. A display apparatus according to claim 4, wherein when varying the number of low-order subframes and remaining subframes, said display control circuit controls a total light producing period within a frame to remain constant.

12. A display apparatus according to claim 2, wherein the display includes scanning lines and during low-order subframes during which interlaced scanning is achieved, said display control circuit controls all scanning lines to be scanned successively, with two lines adjoining in a vertical direction being paired, and the same display being carried out on two lines.

13. A display apparatus according to claim 12, wherein a scan to be carried out with two adjoining lines paired is a scan starting with a first line, and either data for an odd line or data for an even line is displayed.

14. A display apparatus according to claim 12, wherein in a scan to be carried out with two adjoining lines paired, a scan starting with a first line and the scan starting with a second line are carried out alternately screen by screen, and data for an odd line and data for an even line are alternately displayed.

15. A display apparatus according to claim 2, wherein said display control circuit controls low-order subframes so that display is performed continually on a line selected from consecutive lines during consecutive frames.

16. A display apparatus according to claim 2, wherein said display control circuit controls low-order subframes so that display is performed by continually selecting lines from consecutive lines, during frames equivalent to a number of combinations of corresponding selected frames out of corresponding consecutive frames respectively.

17. A display apparatus according to claim 15, wherein said display control circuit displays data for a selected line on all consecutive lines.

18. A display apparatus according to claim 2, wherein said display control circuit varies display data to be displayed during the subframes, during which noninterlaced scanning is achieved, relative to the subframes during which interlaced scanning is achieved, according to display data to be transmitted during a field during which no display is performed.

19. A display apparatus according to claim 2, wherein said display control circuit varies a display order of subframes within one frame.

20. A display apparatus according to claim 19, wherein said display control circuit varies the display order of subframes within one frame according to an external instruction signal.

21. A display apparatus according to claim 19, wherein said display control circuit automatically varies the display order of subframes within one frame according to the number of the low-order subframes during which interlaced scanning is achieved and the number of the remaining subframes during which noninterlaced scanning is achieved.

22. A display apparatus according to claim 2, further comprising a display data input interface or a picture signal input interface.

23. A display apparatus according to claim 22, wherein a driving method for said display unit is a writing addressing approach.

24. A display apparatus according to claim 22, wherein a driving method for said display unit is an erasure addressing approach.

25. A display apparatus, comprising:
a display unit in which picture data to be displayed is rewritten frame by frame, each frame being divided into a plurality of subframes, including low-order luminance level subframes; and
a display control device to vary a luminance level of light produced within the plurality of subframes to independently control display of each of the plurality of subframes, wherein interlaced scanning is performed for the low-order subframes and noninterlaced scanning is performed for subframes other than low-order subframes.

* * * * *

UNITED STATES PATENT AND TRADEMARK OFFICE
CERTIFICATE OF CORRECTION

PATENT NO.: 5,898,414
DATED : April 27, 1999
INVENTOR(S): Kenji AWAMOTO et al.

It is certified that error appears in the above-identified patent and that said Letters Patent is hereby corrected as shown below:

Col. 1, line 56, after "problem" insert --,--.

Col. 2, line 10, delete "puts".

Col. 3, line 38, delete "and" (second occurrence).

Col. 4, line 3, after "Yn" insert --via--;
line 18, delete ",".

Col. 5, line 41, after "frame" insert --frequency--.

Col. 6, line 1, after "comprises" insert --:--;
line 5, after "by" insert --the--.

Col. 14, line 27, delete ",".

Signed and Sealed this

Ninth Day of November, 1999

Attest:

Q. TODD DICKINSON

*Attesting Officer*      *Acting Commissioner of Patents and Trademarks*